US012580754B2

(12) United States Patent
Modi et al.

(10) Patent No.: US 12,580,754 B2
(45) Date of Patent: Mar. 17, 2026

(54) DECENTRALIZED BLOCKCHAIN ENABLED MOBILE COMMUNICATIONS ON A SECURE, OPEN AND DISTRIBUTED NETWORK

(71) Applicant: Movius Interactive Corporation, Duluth, GA (US)

(72) Inventors: Amit Modi, Fremont, CA (US); Philip Lowman, Ellijay, GA (US)

(73) Assignee: Movius Interactive Corporation, Duluth, GA (US)

( * ) Notice: Subject to any disclaimer, the term of this patent is extended or adjusted under 35 U.S.C. 154(b) by 239 days.

(21) Appl. No.: 18/198,964

(22) Filed: May 18, 2023

(65) Prior Publication Data

US 2024/0388428 A1     Nov. 21, 2024

Related U.S. Application Data

(60) Provisional application No. 63/434,079, filed on Dec. 20, 2022.

(51) Int. Cl.
*H04L 9/08*          (2006.01)
*H04L 9/30*          (2006.01)

(52) U.S. Cl.
CPC .......... *H04L 9/0866* (2013.01); *H04L 9/0894* (2013.01); *H04L 9/3073* (2013.01)

(58) Field of Classification Search
CPC ....... H04L 9/32; H04L 9/0866; H04L 9/0894; H04L 9/3073; H04L 9/30; H04L 9/08; H04L 9/0804

USPC .......................................................... 713/171
See application file for complete search history.

(56) References Cited

U.S. PATENT DOCUMENTS

| | | | | |
|---|---|---|---|---|
| 8,898,455 B2 * | 11/2014 | Nguyen | ............... | H04L 9/3271 |
| | | | | 713/155 |
| 11,196,623 B2 * | 12/2021 | Smith | ................. | H04L 61/4505 |
| 11,212,094 B2 * | 12/2021 | Diaz Vico | ............ | H04L 9/0637 |
| 11,293,865 B2 * | 4/2022 | Birnkrant | ........... | G01D 5/35358 |
| 11,310,310 B2 * | 4/2022 | Paillet | ................. | H04L 67/1068 |
| 11,588,643 B2 * | 2/2023 | Maniyar | ............... | H04L 9/3236 |
| 11,831,779 B2 * | 11/2023 | Yadav | ................... | H04L 9/3231 |
| 2017/0083907 A1 * | 3/2017 | McDonough | ...... | G06Q 20/3825 |
| 2019/0141048 A1 * | 5/2019 | Fallah | ................... | H04L 9/0643 |
| 2020/0034550 A1 * | 1/2020 | Kim | ........................ | H04L 9/085 |
| 2020/0067708 A1 * | 2/2020 | Subba | ................... | H04L 9/3226 |
| 2020/0118124 A1 * | 4/2020 | Menon | .................. | H04W 12/06 |
| 2020/0213127 A1 | 7/2020 | Maniyar et al. | | |
| 2021/0126826 A1 * | 4/2021 | Nolan | ................... | H04W 12/76 |
| 2021/0218710 A1 * | 7/2021 | Fallah | ....................... | H04L 9/14 |
| 2021/0234675 A1 * | 7/2021 | Hébert | ...................... | H04L 9/30 |
| 2021/0352139 A1 * | 11/2021 | Madisetti | ................. | H04L 9/50 |

(Continued)

*Primary Examiner* — Sargon N Nano

(74) *Attorney, Agent, or Firm* — Smith Tempel Blaha LLC; Gregory Scott Smith

(57) ABSTRACT

Decentralized blockchain enabled mobile communications on a secure, open and distributed network and that is network agnostic. Networks of future will be based on cellular, Wi-Fi, and/or satellite technology, may be private or public, will be decentralized and will provide a variable network capacity, latency and bandwidth. The endpoints for networks will vary but increasingly include several Internet-Of-Things (IOT) endpoints. Peer-to-peer connections traverse many of these networks. As of today, communications networks will continue to exist in secure and not secure embodiments.

20 Claims, 6 Drawing Sheets

(56) References Cited

U.S. PATENT DOCUMENTS

| | | | |
|---|---|---|---|
| 2022/0029831 A1* | 1/2022 | Baek | G16Y 10/75 |
| 2022/0191272 A1* | 6/2022 | Madisetti | H04L 67/104 |
| 2022/0286354 A1* | 9/2022 | Smith | H04L 9/0825 |
| 2022/0294690 A1* | 9/2022 | Nolan | G06F 16/1834 |

* cited by examiner

FIG. 6

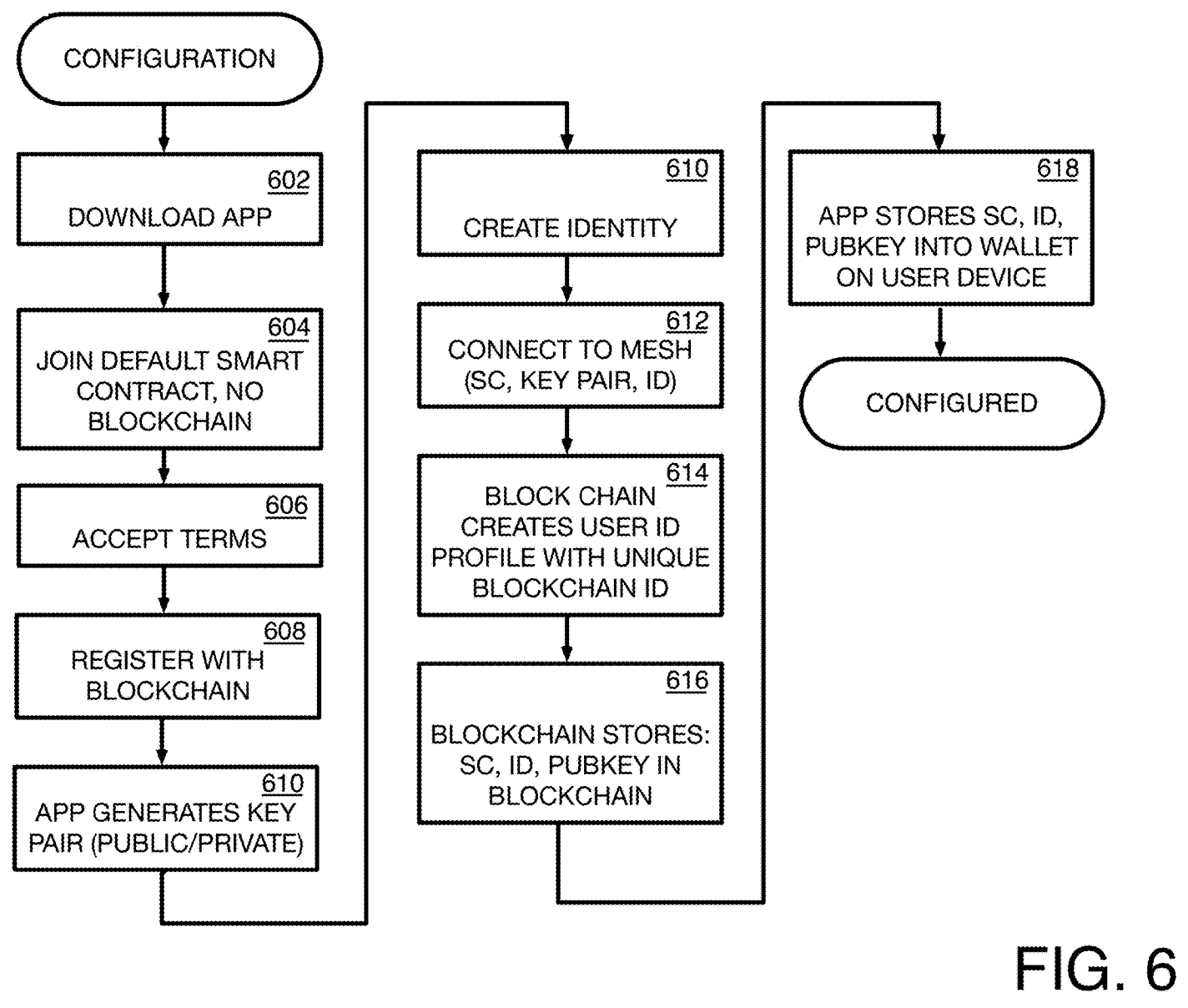

618
APP STORES SC, ID, PUBKEY INTO WALLET ON USER DEVICE

CONFIGURED

610
CREATE IDENTITY

612
CONNECT TO MESH (SC, KEY PAIR, ID)

614
BLOCK CHAIN CREATES USER ID PROFILE WITH UNIQUE BLOCKCHAIN ID

616
BLOCKCHAIN STORES: SC, ID, PUBKEY IN BLOCKCHAIN

CONFIGURATION

602
DOWNLOAD APP

604
JOIN DEFAULT SMART CONTRACT, NO BLOCKCHAIN

606
ACCEPT TERMS

608
REGISTER WITH BLOCKCHAIN

610
APP GENERATES KEY PAIR (PUBLIC/PRIVATE)

DECENTRALIZED BLOCKCHAIN ENABLED MOBILE COMMUNICATIONS ON A SECURE, OPEN AND DISTRIBUTED NETWORK

GOVERNMENT STATEMENT

This invention was made with Government support under (FA864922P1160contract) awarded by (Air Force SBIR/ STTR). The Government has certain rights in the invention.

BACKGROUND

Existing network communications systems and topology are not keeping up with the expanding functionality of equipment that requires connectivity.

What is needed in the art is a solution that expands the security of communications, broadens the variety of ways to be connected, utilizes state of the art technology for encryption, identification and authentication, and does not depend on the current network backbone.

SUMMARY

The present invention, as well as features and aspects thereof, is directed towards providing decentralized blockchain enabled mobile communications on a secure, open and distributed network. A network agnostic, decentralized solution for secure communications is increasingly necessary. Networks of future will be based on cellular, Wi-Fi, and/or satellite technology, may be private or public, will be decentralized and will provide a variable network capacity, latency and bandwidth. The endpoints for networks will vary but increasingly include several Internet-Of-Things (IOT) endpoints. Peer-to-peer connections traverse many of these networks. As of today, communications networks will continue to exist in secure and not secure embodiments.

BRIEF DESCRIPTION OF THE DRAWINGS

FIG. 6 is a flow diagram illustrating the configuration of a client device to be utilized on the DBC network.

DETAILED DESCRIPTION OF VARIOUS EMBODIMENTS ON

Figure 1:
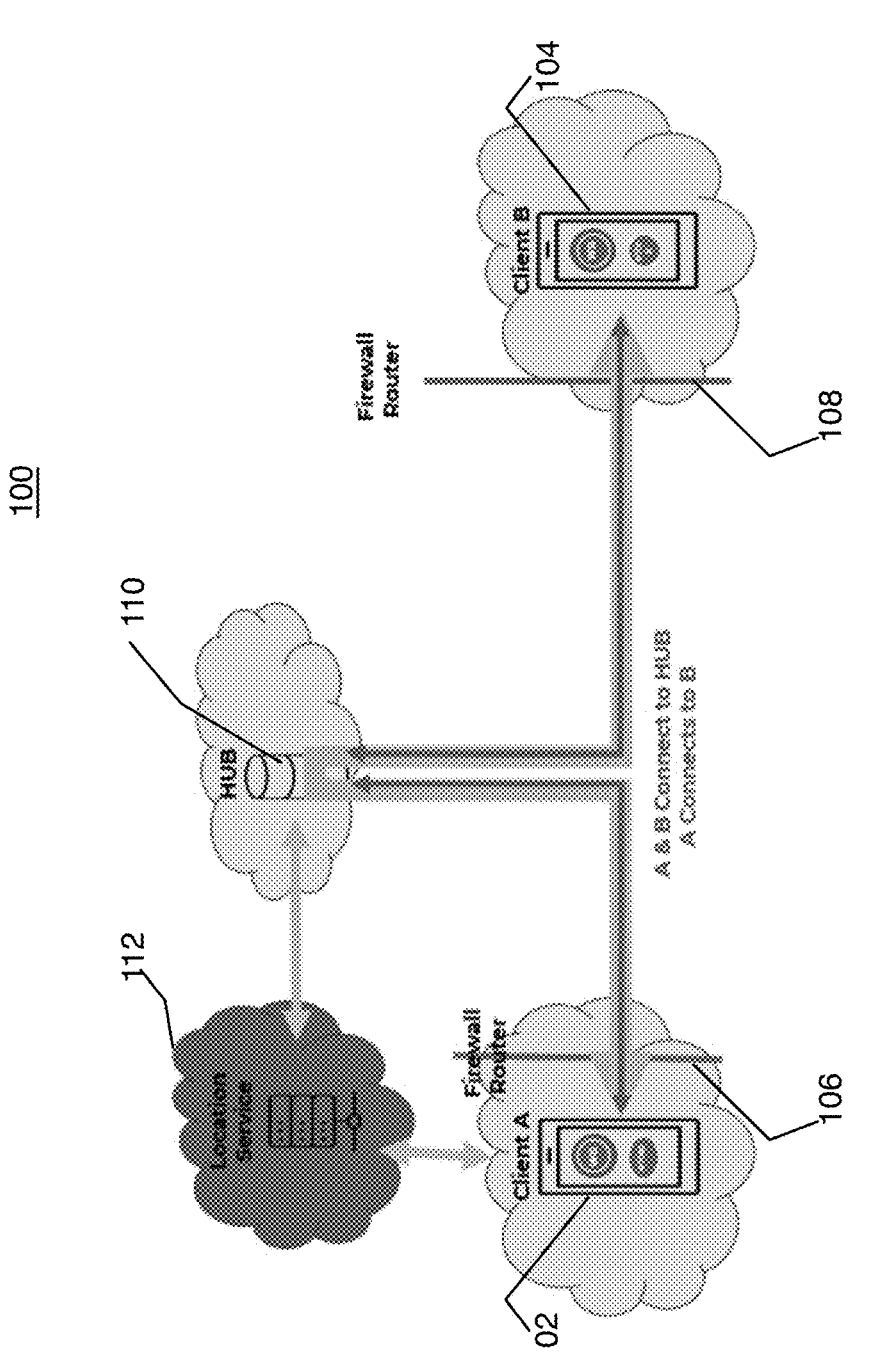
FIG. 1 is a block diagram of an exemplary network communications systems.

The present invention, as well as features and aspects thereof, is directed towards providing decentralized blockchain enabled mobile communications on a secure, open and distributed network. A network agnostic, decentralized solution for secure communications is increasingly necessary. Networks of future will be based on cellular, Wi-Fi, and/or satellite technology, may be private or public, will be decentralized and will provide a variable network capacity, latency and bandwidth. The endpoints for networks will vary but increasingly include several Internet-Of-Things (IOT) endpoints. Peer-to-peer connections traverse many of these networks. As of today, communications networks will continue to exist in secure and not secure embodiments.

The communication networks and systems of today primarily consist of a centrally controlled server client-based architecture. Some networks and systems have migrated to a more end-point-to-end-point structure for communications. In such structures, the data is secured by implementing encryptions from end-to-end. For instance, the WHATSAP and TELEGRAM apps and communication technologies are structured in this manner. But even in such communication systems, the central-server and client-based architecture is still the underlying structure of the network and operation. The various embodiments of the present invention focus on providing a network architecture that has a level of freedom of communication that is free from risk of being controlled by the central entity. In the former network architectures, if the central entity is compromised, the entire network is compromised. Furthermore, in such networks, individuals have no control over protecting their identity and implementing protective measures. Rather, the individuals are at the mercy of the central entity.

A MESH network can be defined as a local area network topology in which the infrastructure nodes (i.e. bridges, switches, and other infrastructure devices) connect directly, dynamically and non-hierarchically to as many other nodes as possible and cooperate with one another to efficiently route data to and from clients, which are also nodes.

This lack of dependency on one node allows for every node to participate in the relay of information. MESH networks dynamically self-organize and self-configure, which can reduce installation overhead. The ability to self-configure enables dynamic distribution of workloads, particularly in the event a few nodes should fail. This in turn contributes to fault-tolerance and reduced maintenance costs.

MESH topology differs from the conventional local network topologies in which the bridges/switches are directly linked to only a small subset of other bridges/switches (i.e., centrally controlled), and the links between these infrastructure neighbors are hierarchical.

MESH network topologies provide several advantages over prior art network topologies. Some of these advantages include:

Flexible coverage: Additional points can be added to get better coverage in hard-to-cover areas like hallways and near walls for outdoor coverage.

Self-healing: In a mesh network, if one point goes down, communication is simply rerouted through another point.

Direct path: Since all of the points are connected to each other, data can take several paths toward its destination and it will always choose the best route from Point A to Point B.

A wireless MESH network (WMN) is a MESH network created through the connection of wireless access point (WAP) nodes installed at each network user's locale. The networking infrastructure is decentralized and simplified because each node need only transmit as far as the next node. WMNs may or may not be connected to the internet.

Mesh networks (wireless, wired, or hybrids) can be used for any application where network end nodes are too far apart to share direct access to a central location, such as an internet connection. Any type of network protocol can be used throughout the network.

Wireless mesh networks work through mesh nodes, mesh clients and gateways. MESH nodes are WAP devices with multiple radio systems. Nodes act as MESH routers and endpoints. Firmware enables them to share data between other nodes in the network.

Mesh clients are wireless devices, such as laptops, mobile phones and tablet computers.

Gateways are nodes that connect two networks using different protocols. Data passes through the gateway as it enters or exits a network.

Each node in a MESH network has at least one path—but often multiple—to other nodes, which creates multiple routes of information for pairs of users. This makes the network more resilient, and in the event of a WAP or connection failure, information can still access other nodes.

In the various embodiments of the present invention, a novel network architecture is provided. The novel network is based on three building blocks.

First of all, each of the endpoints in the network are viewed as nodes rather than client devices or client servers. The nodes are connected over a MESH and the nodes are connected endpoints. As such, each endpoint or destination and/or source of communications is a node. The nodes can be mobile devices, laptop computers, mobile telephones, servers, point-of-sale devices and even Internet of Things ("IOT") devices.

Secondly, the underlying interconnectivity of the networks, or the MESH can be any one or more of a variety of network types, or stated otherwise, may consist of a particular network technology or a hybrid of one or more technologies such as cellular, satellite, WiFi, BLUETOOTH, and any other forms of networks are also envisioned. Finally, the databases, ledges, apps, functionality, etc. that is available to users of the network is all distributed rather than being centrally stored. Thus, each of these items are located on the various nodes. Advantageously, if a node is comprised, the items can be redistributed to maintain functionality and communication over the network, rather than the network being disabled in response to a central server being compromised.

Thirdly, each of the nodes or users within the network have autonomous control of their identity. The identity or users and systems are not centrally controlled, and so, the users or systems have the ability to revise and change their identity to maintain privacy and eliminate vulnerability to phishers, hackers, etc. by allowing the user to autonomously change identities and control who can communicate with the user.

Another aspect of the present invention is implemention of a message and calling paradigm that cuts across these three described fundamental building blocks: MESH node-based topology, varied network types interconnected, and user control of identity. The underlying network or MESH is a set of distributed nodes, not a particular type.

The underlying network in the MESH topology is a pure IP transport layer with IP based transport between nodes. The IP based transport defines how the communication flows, how to mute, how to add nodes, how to delete nodes, etc. For instance, suppose user A wants to speak to user B, or user A wants to send a communication message to user B. This includes two different types of encapsulation of the message or information. This is further complicated when it is realized that user A may be cellular, user B may be wifi or other network types.

In operation, a peer-to-peer connection is established on the control plane on the top of the data layer. Software determines various aspects of the connection: (1) identity— who is B, who is A, this identity could be a phone number, email address, identifier (i.e. hex digits, binary code, etc.) or other similar element; (2) encryption—what type of encryption is being used to secure the connection (i.e. post quantum or other); (3) modality—when a message is sent, which modality will be utilized (i.e. SMS, TEXT, CALL, etc.); (4) connectivity—how to reach B and how to maintain connection between A and B if the connection goes through an intermediary node that gets compromised.

The present invention provides a network agnostic, decentralized solution for network communications, referred to herein as the DBC network or decentralized blockchain network. The DBC network is novel over prior art networks in that the DBC network provides, among other things, the following features:

Anonymity, Privacy, and Freedom.

User Controls own Identity.

Works with any Network provider.

Dynamic connection allocation.

Inter Tunnel created P2P.

Encrypted Peer to Peer.

A novel aspect of the present invention is the utilization of blockchain to facilitate secure connectivity and authentication. A blockchain is a growing list of records, called blocks, which are linked using cryptography. Each block contains a cryptographic hash of the previous block, a timestamp, and transaction data. The technology is being adapted into many verticals like healthcare, medicines, insurance, smart properties, automobiles, and even governments. Many governments and leading banks have decided to build many of their conventional transactions based on blockchain technology. The applications and potential of this framework is huge and is considered to be changing the way transactions are made in various domains.

The most successful implementation of blockchain is in the field of cryptocurrency, such as Bitcoin-A Peer-to-Peer Electronic Cash System, which incidentally is also the first implementation of blockchain technology. Thus, to understand blockchain technology, it is best to understand how the Bitcoin System is designed and implemented.

The blockchain architecture is rather complex. Blockchain was first introduced as a solution to prevent double-spending and provide anonymity in financial transactions. In essence, Bitcoin is digital currency and to prevent a user from using the same digital currency by giving multiple copies to others, either a central regulatory entity needs to be involved, such as a bank maintaining a ledger, or another solution is necessary. That solution is blockchain technology. The blockchain allows the ledger of transactions to be maintained by the public and still preserve anonymity. The basis of the operation of blockchain is the use of public key cryptography (PKI).

Basically, when two parties exchange messages, it is important to establish a level of trust between the sender and receiver. PKI accomplishes this in the following manner. If sender A wants to send a message or money to receiver B, sender A has to create a private/public key pair of its own. Sender A can then create a message in plain-text that contains sender A's public key, receiver B's public key, and the message. The entire message is then signed using sender A's private key. Receiver B can then use a signature verification algorithm of PKI and sender A's public key to ensure that the message originated from sender A. Receiver B can then send a message to sender A and encrypt the message with sender A's public key that was received from the message sent by sender A. Receiver B also will sign the message using a secret key that was shared between sender A and receiver B during an HTTPS handshake. Sender A can then use receiver B's public key to validate the signature. At this point only sender A can decode the message using the private key that is held by sender A alone. If the message were to be intercepted by a third party, the third party would not be able to recover the contents because they do not have the secret key.

Thus, the PKI is able to provide authentication and security. The public key authenticates the sender of the digital message, while the private key ensures that only the recipient can open and read it. For example, party A uses B's public key to validate B's signature and uses A's private key to decrypt the message.

A blockchain is a distributed database or ledger that is shared among the nodes of a computer network. As a database, a blockchain stores information electronically in digital format. The innovation with a blockchain is that it guarantees the fidelity and security of a record of data and generates trust without the need for a trusted third party.

One key difference between a typical database and a blockchain is how the data is structured. A blockchain collects information together in groups, known as blocks, that hold sets of information. Blocks have certain storage capacities and, when filled, are closed and linked to the previously filled block, forming a chain of data known as the blockchain. All new information that follows that freshly added block is compiled into a newly formed block that will then also be added to the chain once filled.

A database usually structures its data into tables, whereas a blockchain, as its name implies, structures its data into chunks (blocks) that are strung together. This data structure inherently makes an irreversible timeline of data when implemented in a decentralized nature. When a block is filled, it is set in stone and becomes a part of this timeline. Each block in the chain is given an exact timestamp when it is added to the chain.

The goal of blockchain is to allow digital information to be recorded and distributed, but not edited. In this way, a blockchain is the foundation for immutable ledgers, or records of transactions that cannot be altered, deleted, or destroyed. This is why blockchains are also known as a distributed ledger technology (DLT).

Many companies are set up with central servers that monitor, store and house all the companies sensitive and valuable data. This, however, provides a single point of failure. Thus, an even such as loss of power, flood, fire, loss of internet connectivity, penetration from a hacker etc. can result in a catastrophic loss to the company.

Blockchain allows the data held in a distributed database that is spread out among several network nodes at various locations. This not only creates redundancy but also maintains the fidelity of the data stored therein—if somebody tries to alter a record at one instance of the database, the other nodes would not be altered and thus would prevent a bad actor from doing so. If one user tampers with a record of transactions, all other nodes would cross-reference each other and easily pinpoint the node with the incorrect information. This system helps to establish an exact and transparent order of events. This way, no single node within the network can alter information held within it.

Because of this, the information and history (such as of transactions of a cryptocurrency) are irreversible. Such a record could be a list of transactions (such as with a cryptocurrency), but it also is possible for a blockchain to hold a variety of other information like legal contracts, state identifications, or a company's product inventory.

Because of the decentralized nature of blockchain, all transactions can be transparently viewed by either having a personal node or using blockchain explorers that allow anyone to see transactions occurring live. Each node has its own copy of the chain that gets updated as fresh blocks are confirmed and added. This means that if you wanted to, you could track messages wherever they go.

For example, exchanges have been hacked in the past, where those who kept Bitcoin on the exchange lost everything. While the hacker may be entirely anonymous, the Bitcoins that they extracted are easily traceable. If the Bitcoins stolen in some of these hacks were to be moved or spent somewhere, it would be known.

Of course, the records stored in the Bitcoin blockchain (as well as most others) are encrypted. This means that only the owner of a record can decrypt it to reveal their identity (using a public-private key pair). As a result, users of blockchains can remain anonymous while preserving transparency.

The present invention focuses on providing a more distributed, secure, autonomous communications system. There are several technical offerings that provide a solution for end-to-end communications but the DBC network solution, utilizing blockchain technology, exceeds such solutions in functionality and efficiency. For example, Table 1 compares the features provided by the embodiments of the present invention with four other popular technologies: WHATSAPP, SIGNAL, WICKR, and MATTERMOST.

TABLE 1

| FEATURE | DBC | WHATSAPP | SIG-NAL | WICKR | MATTER MOST |
|---|---|---|---|---|---|
| Voice Call Enabled | Yes | Yes | Yes | Yes | Yes |
| Open, Distributed, Blockchain Based Network | Yes | No | No | No | No |
| Encryption Peer To Peer | Yes | Yes | Yes | Yes | Yes |
| Post Quantum Encryption | Yes | No | No | No | No |
| Blockchain Based Identity | Yes | No | No | No | No |
| Self-Sovereign Identity | Yes | No | No | No | No |
| Key Swap | Yes | No | No | No | No |
| Blockchain Control A | Yes | No | No | No | No |

As such, it will be appreciated that the DBC network solution provides a wide and robust range of features that are not available on typical communications network solutions. Other features and advantages of the DBC solution can be realized by examining applications and usages.

It will be appreciated that the provision of security, anonymity and trust are essential elements in a communications network and the DBC network provides such elements. A few real-world examples of how essential security, anonymity and trust in a communications network are as follows:

1. Military field personal calling in coordinates of a target.
2. Ambient condition recognition at the edge enabling alert triggers via voice or text
3. Geo-Political sensitive communication that need assurance that the communications cannot be thwarted
4. Remote Fisherman being able to reliably provide a distress call or fish density location.
5. Commercial use cases have the need for reliable and secure peer-to-peer communication and commerce But in addition to the provision of security, anonymity and trust, it should also be understood that applications, and usability are equally important. Further, having a large mix of secure and non-secure users allows a user to hide as a piece of hay in a haystack. Even further, embodiments of the DBC network operate to commercialize the IOT and mobile applications in the MESH network.

The DBC network provides ISR (Intelligence, Surveillance, Reconnaissance) at a higher, commercially feasible, and more cost-effective manner that what is presently available. The DBC network solution includes:

1. Secure Communications Plane (SCP) that augments the decentralized ecosystem
2. Fungible or Non-fungible Identity
3. Voice and messaging as multi-faceted capabilities
4. Geographically dispersed, standards based and non-blockable communications service
5. Artificial Intelligence (AI) powered safer distributed edge Blockchain is a distributed ledger technology that is used to record and store data across a network of computers. It is a decentralized system that is cryptographically secure and can be used to store digital assets, track transactions, and facilitate smart contracts.

Peer-to-peer (P2P) is a type of network architecture in which each node or computer in the network acts as both a client and a server. It is a decentralized system in which each node can connect directly with other nodes in the network, without the need for a central server. P2P networks are typically used for file sharing, streaming media, and other applications.

The main difference between blockchain and peer-to-peer is that blockchain is a distributed ledger which is tamper proof, decentralized and secure.

The blockchain technology utilized in various embodiments of the present invention improves security and privacy in telephony, such as telephone communication. It encrypts data, such as telephone calls, messages, and files, making it more difficult for malicious actors to access them. It also is used to authenticate telephone calls, preventing spoofing and phishing attempts.

The decentralized blockchain solution for communications helps improve the security and privacy of data communication by providing an encrypted, distributed ledger of all communications, which prevents it from being tampered or altered. This would help to ensure that all communication is secure and private. Additionally, it could be used to facilitate peer-to-peer transactions, allowing users to purchase telecom services directly from other users without the need for a third-party intermediary. Finally, it could be used to enable smart contracts, allowing users to automatically execute contracts based on predetermined conditions.

The various embodiments that provide for decentralized blockchain enabled mobile communications on a secure, open and distributed network (the Secure Mesh) provides many advantages over existing technology. Some of these advantages are enumerated below.

1. Increased Security: Blockchain technology is very secure and provides an effective way to protect telephony, such as telephone communication from being hacked or compromised. Through the utilization of cryptographic techniques and decentralized ledgers, it can ensure that all data is stored securely and accurately.
2. Improved Privacy: With blockchain, telephony, such as telephone communication is completely private and encrypted. This allows users to ensure that only the intended recipients can access their data, without the risk of it being shared with unauthorized parties. Exhibit A illustrates exemplary architectures for providing this capability.
3. Reduced Costs: By eliminating the need for third-party intermediaries, the blockchain solution of the various embodiments can help reduce the costs associated with traditional telephony, such as telephone communication. This can be especially beneficial for businesses that rely heavily on telephone communication.
4. Faster Transactions: Blockchain technology enables faster transactions than traditional telephony and is decentralized. By eliminating the need for manual processing, it can speed up the process of sending and receiving messages.
5. Increased Transparency: Blockchain can provide greater transparency for telephony, including all varieties of telephone, messaging, etc. communication. This is because the data stored in the blockchain is publicly available, making it easier to track and verify transactions.

In various embodiments of the Secure Mesh, P2P protocol is utilized to help or assist communications by allowing users to communicate directly with one another without having to rely on a centralized server breaking the dependency on any sovereign entity. This can help reduce latency, increase bandwidth, and make communication more reliable and more secure. Implementation of the P2P protocol and architecture in the various embodiments of the Secure Mesh has several advantages. A few non-limiting examples include the following:

1. Cost Savings: Peer-to-peer protocols can potentially offer cost savings to telephony, such as telephone communication services by eliminating the need for a centralized infrastructure, such as a telephone company. This can help reduce overall communication costs.
2. Increased Network Reliability: Peer-to-peer protocols can provide a more reliable network for telephony, such as telephone communication, by eliminating single points of failure. This can help ensure that telephone calls and other communications are not dropped or interrupted due to a single malfunctioning node.
3. Improved Security: Peer-to-peer protocols can provide improved security for telephony, such as telephone communication services. By eliminating the need for a central server, the risk of data breaches is greatly reduced.
4. Increased Flexibility: Peer-to-peer protocols can provide increased flexibility for telephony, such as telephone communication services. By eliminating the need for a centralized infrastructure, different types of networks can be used to create phone communication services.

The technology of the present invention can be incorporated into or applied in a variety of settings, manners, embodiments, etc. A few non-limiting examples include:

Secure Wallets: Use secure wallets to store identity information.

Enable Multi-Signature Transactions: Multi-signature transactions require multiple signatures to approve a transaction. This can be used to create a secure environment and reduce the risk of theft.

Removing the need to rely on central authorities to provide messenger services.

Enforcing end-to-end encryption with perfect forward secrecy as the default and only mode of operation for all messages.

According to WIKIPEDIA, in cryptography, forward secrecy (FS), also known as perfect forward secrecy (PFS), is a feature of specific key agreement protocols that gives assurances that session keys will not be compromised even if long-term secrets used in the session key exchange are compromised. For HTTPS, the long-term secret is typically the private key of the server. Forward secrecy protects past sessions against future compromises of keys or passwords. By generating a unique session key for every session a user initiates, the compromise of a single session key will not affect any data other than that exchanged in the specific session protected by that particular key. This by itself is not sufficient for forward secrecy which additionally requires that a long-term secret compromise does not affect the security of past session keys.

Forward secrecy protects data on the transport layer of a network that uses common Transport Layer Security protocols, including OpenSSL, when its long-term secret keys are compromised, as with the Heartbleed security bug. If forward secrecy is used, encrypted communications and sessions recorded in the past cannot be retrieved and decrypted should long-term secret keys or passwords be compromised in the future, even if the adversary actively interfered, for example via a man-in-the-middle attack.

The value of forward secrecy is that it protects past communication. This reduces the motivation for attackers to compromise keys. For instance, if an attacker learns a long-term key, but the compromise is detected and the long-term key is revoked and updated, relatively little information is leaked in a forward secure system.

The value of forward secrecy depends on the assumed capabilities of an adversary. Forward secrecy has value if an adversary is assumed to be able to obtain secret keys from a device (read access) but is either detected or unable to modify the way session keys are generated in the device (full compromise). In some cases an adversary who can read long-term keys from a device may also be able to modify the functioning of the session key generator, as in the backdoored Dual Elliptic Curve Deterministic Random Bit Generator. If an adversary can make the random number generator predictable, then past traffic will be protected but all future traffic will be compromised.

The value of forward secrecy is limited not only by the assumption that an adversary will attack a server by only stealing keys and not modifying the random number generator used by the server but it is also limited by the assumption that the adversary will only passively collect traffic on the communications link and not be active using a Man-in-the-Middle (MITM) attack. Forward secrecy typically uses an ephemeral Diffie-Hellman key exchange to prevent reading past traffic. The ephemeral Diffie-Hellman key exchange is often signed by the server using a static signing key. If an adversary can steal (or obtain through a court order) this static (long term) signing key, the adversary can masquerade as the server to the client and as the client to the server and implement a classic Man-in-the-Middle attack.

Security can be enhanced by making the user identity impossible to forge without the possession of the user's personal private key, which never leaves the user's computer. Further, the use of encryption, such that data and communications are encrypted ensuring that the data is secure and inaccessible to unauthorized parties. Even so, it is always a good practice for a user to monitor their funds and transactions regularly. This will help detect any suspicious activity and thus, action can be quickly taken.

The Secure Communications Plane (SCP) augments the decentralized ecosystem by providing several features. One such feature is smart application logic on the distributed edge, controllable by an Intelligent Control Plane (ICP). Further, the SCP is self-sufficient. The self-sufficient characteristic provides minimal and essential application logic for communications, control and capture. Utilizing commercial standards and regular mobile communications, the SCP enables the DBC network to thwart proof. Another benefit that the SCP provides is that the DBC network and be mutable or permanent. Thus, applications can persist or can be muted by the ICP, for instance, if a risk of compromise is detected, suspected, or anticipated.

Other benefits and features are achieved by enabling the DBC network to be situationally aware by listening to surroundings associated with the endpoints. The SCP enables the DBC network to have a flat applications plane rather than being hierarchical. The SCP allows the network software to be defined and optimized for any edge hardware and network (i.e. sensors operating on automobiles).

The DBC network also supports fungible or non-fungible identity. Fungible identity is a dynamic identity assignment with intelligent network routing whereas non-fungible identity is fixed persona/object for "always-available" communications. The identity for the devices is constructed of the following elements:

Entity: Mobile device or any smart connected thing: persona/object map

Identity/Identifier: Token or an actual phone number or any ICP relatable identifier Identity Attributes: Routable, non-thwartable, communicable, commercial grade and standard The DBC network also provides voice as a multi-faceted capability. In providing such capability, the DCP network allows for mono-directional alerts, bi-directional communication and biometric authentication. Further, such capabilities also enable the DBC network to provide ambient condition detection and deconstructed voice-gram messaging.

The DBC network is geographically dispersed, standards based and provides a non-blockable communications service. The DBC network is global in nature. As such, the DBC network works in any geography, local or "glocal", which refers to focusing on both local and global considerations. The DBC network is also network agnostic, meaning that whatever the underlying network or channels are, the DBC network is fully functional. As such, the DBC network works over cellular, Wi-Fi, satellite or even other defense specific networks. Advantageously the DBC network cannot be blocked by others, such as Russia or China or other entities engaged in espionage, surveillance or electronic intelligence ELINT or communication intelligence COMINT.

The DBC network is AI powered providing safer distribution physical edge. This is achieved by providing ultra-optimized edge voice AI, speech recognition, and self-learning models. The advantageous characteristics of the DBC network is that it is energy efficient, utilized lightweight ruggedized APIs to work with the edge hardware and model engines coexisting with the ICP.

FIG. 1 is a block diagram of an exemplary network communications systems. Client devices, such as client device A 102 and client device B 104 exist behind their respective firewall routers 106 and 108 for network isolation and security. A hub 110 is used to establish channel connectivity with client device A 102 and client device B 104 and thus, provide a virtual connection of client device A 102 and client device B 104 through the hub 110. Features and functionality, such as location services 112 can be provided to one or more of the client devices, or utilized in the provision of services to client devices through the hub 110.

Networks such as network 100 can provide anonymous and private services free of charge. In such networks the user controls his or her identity and the user devices can access the network through any of the available network providers. The network operates to provide dynamic connection allocation and the connections between endpoints cannot be blocked. As such, users of these networks enjoy the benefit of a freedom of communications over a blockchain based network. Peer-to-peer connectivity and control is available based on inter tunnel technology and data exchanged is protected through peer-to-peer encryption.

Figures 2, 3:
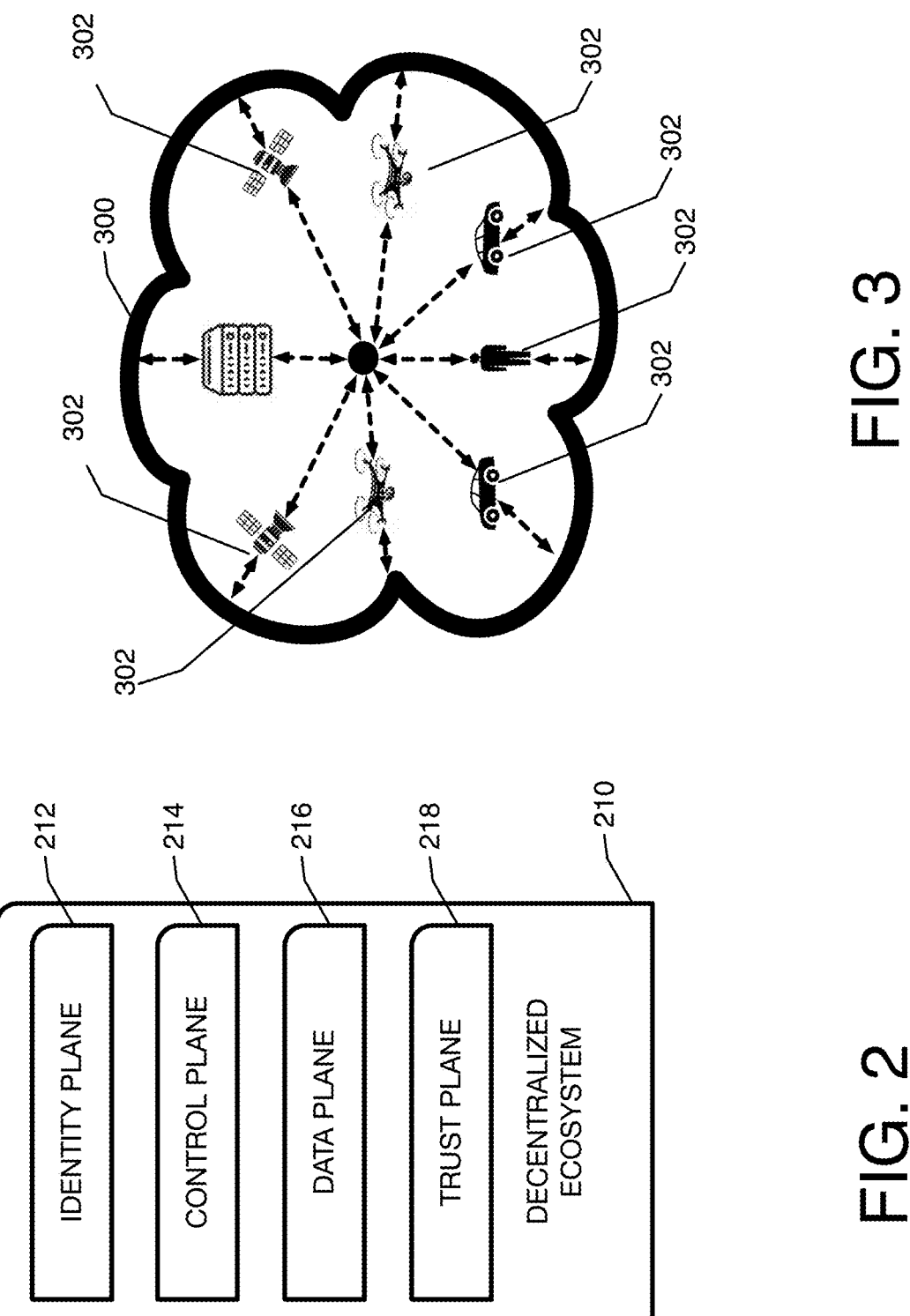
FIG. 2 is a conceptual illustration showing the features employed in exemplary DBC networks to provide security, accessibility and control.
FIG. 3 is a conceptual diagram of how the components of the decentralized ecosystem deployed in the DBC network provide security.

The DBC network operates to secure and enhance the decentralized ecosystem. FIG. 2 is a conceptual illustration showing the features employed in exemplary DBC networks to provide the security, accessibility and control. A decentralized ecosystem 210 is utilized to provide connectivity and access among the various network nodes and client devices. Moving communications to cloud based services and applications and the increased reliance on a mobile workforce have created a completely different profile need in the security arena. For instance, employees are increasingly utilizing or employing their own mobile and computing devices and working remotely, at least part of the time. As a result of this change, data is being accessed outside the corporate network and shared with external collaborators such as partners and vendors. To improve reliability and glocal access, applications and data are moving from on-premises to hybrid and cloud environments. As a result of this migration, companies can no longer rely on traditional network controls for security. Controls need to move to where the data is: on devices, inside apps, and with partners. The decentralized ecosystem accomplishes this by employing an identity plane 212, a control plane 214, a data plane 216 and a trust plane 218. The identity plane 212 is instrumental in controlling which administrators, users and groups have access to resources. This is increasingly critical in cloud environments. Identities, representing people, services, or IoT devices, are the common dominator across networks, endpoints, and applications. Identities are powerful, flexible, and granular way to control access to data. Before an identity can access a resource on the DBC network, the identity plane 212 operates verify the identity with strong authentication and ensures that the access is compliant and typical for that identity. Once the identity has been verified, the identity's access to resources can be controlled based on organization policies, on-going risk analysis, and other tools.

The control plane 214 provides management and orchestration across an organization's cloud environment. This is where configuration baselines are set, user and role access provisioned, and applications sit so they can execute with related services. It's akin to air traffic control for applications. As organizations increasingly shift both their business and apps to the cloud and adopt more services, the use of the control plane becomes critical.

The data plane 216 is responsible for actually carrying and moving traffic within the DBC network. The control plane 214 and data plane 216 work together and need to be synchronized because the control plane 214 will provide configuration updates and determine which path to use, while the data plane 216 will be responsible for forwarding or moving that data traffic or information from one place to another.

The trust plane 218 is where authenticated and controlled identities can communicate peer-to-peer in a trusted environment through the deployment of end-to-end encryption and decryption and the use of block chain encoding to ensure reliable and secure data transfer.

FIG. 3 is a conceptual diagram of how the components of the decentralized ecosystem deployed in the DBC network provide security. The identity plane 212, control plane 214, data plane 216 and trust plane 218 operate to create an intelligent control plane 300 provide secure and reliable communication among the various end point elements 302 utilizing the DBC network.

Figure 4:
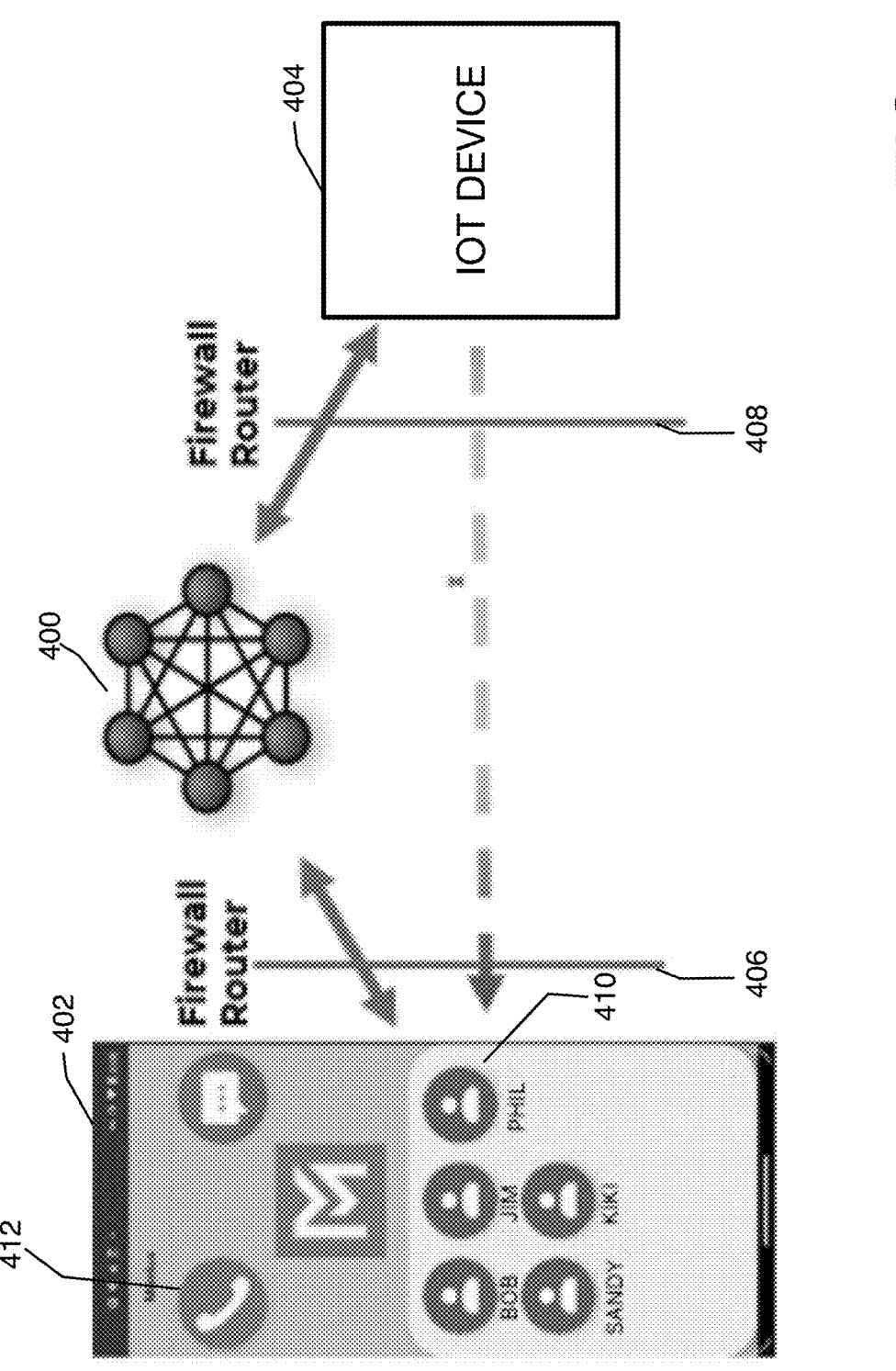
FIG. 4 is a block diagram illustrating aspects of an exemplary DBC network.

FIG. 4 is a block diagram illustrating aspects of an exemplary DBC network. The DBC network 400 is an open, distributed, dynamic, blockchain based network providing secure peer-to-peer communications between users (i.e., client device 402 and client device 404). This peer-to-peer communications includes calls and messaging. The DBC network is novel in that it is the first communications infrastructure built from the ground up with all open blockchain components. For instance, exemplary embodiments of the DBC network may include any or all of the following mesh blockchain components:

Android App

Wallet for crypto identity storage

Node-Every element in the blockchain is a node, but not all nodes are equal.

Distributed ledger-Smart Contracts, Groups, Users, History, Contacts

Cryptography-Asymmetric Encryption where each node has a public key (used to encrypt) and a private key (used to decrypt)

Distributed consensus rules

Block-Data Structure to store transactions

Chain-A sequence of blocks

Figure 5:
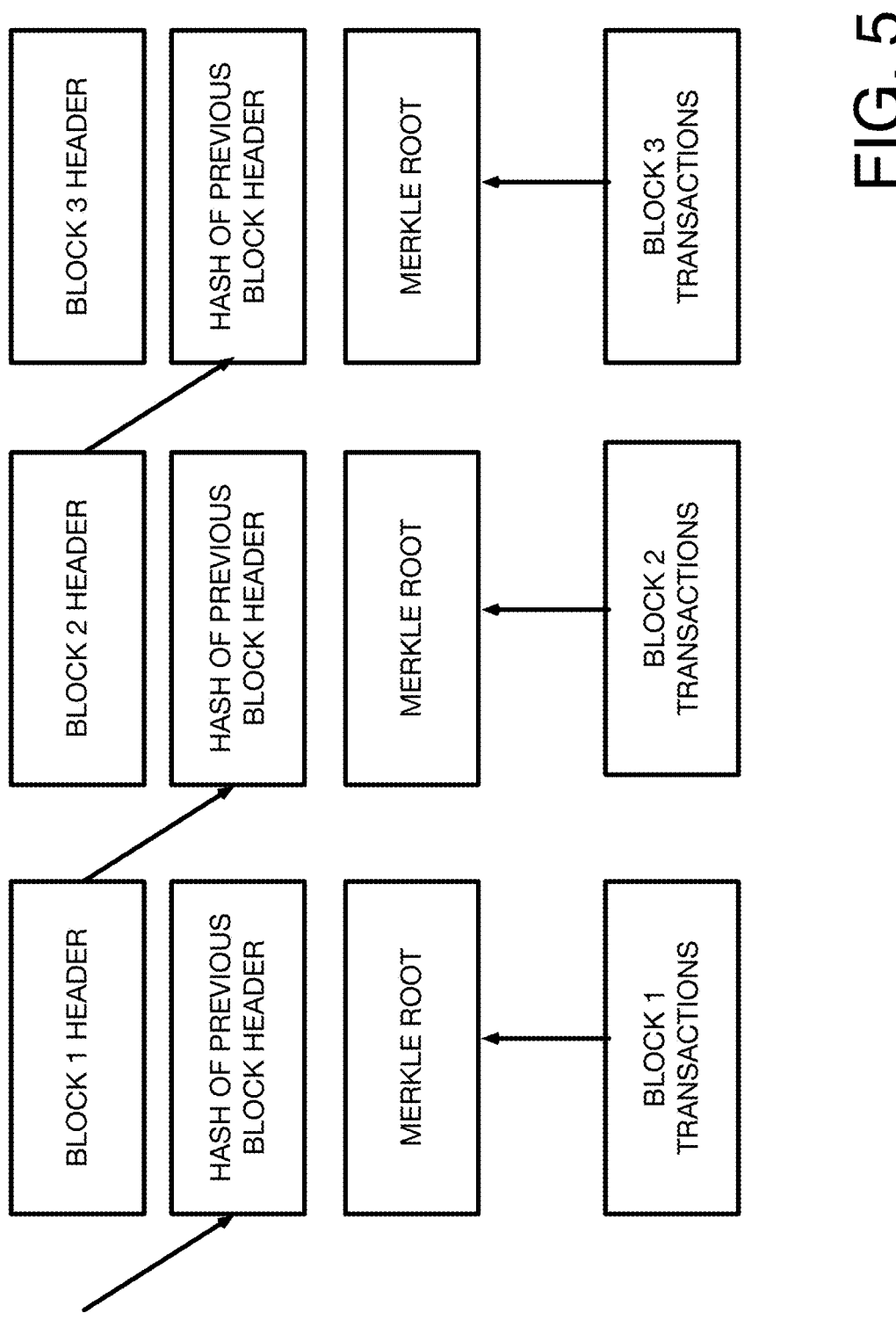
FIG. 5 is a block diagram illustrating a block structure that is suitable in various embodiments of the DBC network.

FIG. 5 is a block diagram illustrating a block structure that is suitable in various embodiment of the DBC network.

The DBC network provides high value and disruptive use cases and is applicable to both commercial and defense hardened applications.

FIG. 6 is a flow diagram illustrating the configuration of a client device to be utilized on the DBC network. Examining the commercial or consumer segment, the DBC network can be utilized by a user performing the following actions, though not necessarily in this order:

(1) Initially a device or node is configured to operate on the MESH. This can be accomplished in a variety of techniques. For instance, and IOT device may come already configured to operate on the MESH or, an app or software can be loaded into the IOT device with a USB card or memory stick or downloaded through a network connection. For a mobile device or computer device, an app can be downloaded from an app store or other source, or loaded via a disk, etc. Thus, the device being connected to the DBC may be a mobile app, an IOT device, a light app, etc. As a non-limiting example, the configuration process starts by the user downloading an app 602 from the PLAYSTORE or other online source, or the app could be loaded into the user device locally with a memory device containing the app. The downloaded app provides access or connectivity for the user device to the DBC network and or other devices on the DBC network. The app is installed within the user device and by default, includes or is configured to be a part of a Public Group Contract. A Public Group Contract is basically a definition of a certain domain of identities in which each of the identities in the group is known to each of the other identities, and the path of communication can flow between any one or more identities to any other one or more identities. The Public Group Contract is the consumer users of the DBC network.

Private Groups are closed user groups that are limited or restricted and as such, a user must be invited or be enabled to gain access to a Private Group. It should be appreciated that users can belong to one or more groups consisting of Public Groups and Private Groups. For instance, a user may be public in one group and private in another group. As a non-limiting example, a defense general could be public in a private group of generals, but private in the private group for the whole base.

The app contains Decentralized IDentifiers (DID) Smart Contracts for free access to various applications, features, functions, etc. As a non-limiting example, the DID Smart Contracts enable or allow for X number of calls per month and/or other operational parameters. Other apps and usage constraints can be obtained through obtaining an updated DID from the DBC network service provider. In addition, the app allows other aps to integrate into the software development kit (SDK) for scale.

(2) Once the node is configured to operate on the DBC, such as once a user downloads the app, the user will have a default Smart Contract 604 but no presence in the blockchain. The Smart Contracts defines one or more constructs for operation on the DBC network.

(3) The user is then required to show an acceptance or an agreement to be bound by and operate within the terms of conditions provided by the DBC network operator 606.

(4) The user is then enabled to select to register with the blockchain from the app 608. The underlying method for sending communications or information is based on the fundamental aspects of a block chain. The user can register with any type of block chain that is available on the network. For example, if the user wants to integrate with a set of users that are part of an organization and members of a particular block chain, the user can register with that block chain. The user may register with other block chains for communicating with other groups or other individuals. Whatever your block chain is, when you go to register, your identity is associated with that block chain and thus, the block chain inherits the restrictions and allowances defined within your identity.

In this new world, block chain is a series of connected nodes, could be very private or a more public chain. The block chain is a set of nodes where communications flow through. If a user wants to join a particular block chain, the user gets their own public and private key pair, which is part of the user identity.

Once the user is registered with the block chain, the app will generate a unique key pair (Public and Private) 610 which is utilized during blockchain transaction.

(5) The user can then create an identity 612 which will be provided to peers and then utilized by those peers to access or communicate with the user. The created identity is a self-sovereign identity. Further, the identity can be any alphanumeric string which is unique within the users group. A QR code can be generated and passed to peers for identification access also.

Utilizing the app or the MESH configured device, the public and private keys can be generated and then an identity can be created.

In an exemplary embodiment, the identity is created by a user first using the app or MESH configured device to register with a Central ID Process to establish the user as a known and accredited party. Once registered the user can get an identity. The user's identity defines what the user is allowed to do or not to do and defines what others are allowed to do in association with the user (i.e., can the message the user, call the user, join a group with the user, etc.). The user can autonomously change his or her identity on the fly, and once changed, others that the user wants to know can be immediately updated with regards to the new ID or the user can control who gets updated and when that update occurs. In some embodiments, the user identity is shared with others using an "out-of-band" mechanism rather than the DBC. This may include a transmission or a physical provision. But, it is noted that there is no directory that include the user identities in the system and no one can look up and search a user identity as it is not centrally stored or managed. The user can change his or her identity for any of a variety of reasons, such as maintaining security, preventing spam and fishing, etc. Unlike email addresses, which are tied to an organization, the identity is unique to the individual and is not tied to any other organization or system.

(6) The user then connects to the MESH with a Smart Contract, Key Pair, and identity 612.

(7) The blockchain operates to create a new User Identity Profile, with a unique blockchain ID 614 in the distributed Ledger (Internal to Mesh) and stores the Smart contract, Identity, and Public key in the blockchain 616. The various embodiments of the present invention implement the known concept of using block chains, which allow data to be protected and authenticated as to source and ownership, within a telecommunication setting, and more particular, as integral to real-time communications over the MESH. Thus, a message received from any particular user is assured not to be a spoof or phishing because block chain ensures that the receiving party knows from who the message was sent.

An example of this concept can be realized by examining open cellular networks such as the Pollen network. The Pollen network is a completely open and decentralized network. When a user wants to operate on the Pollen network, they need to buy a sim or register for an account on the Pollen network. If the user has an account on the Solana block chain, which is a global block chain, the user can use the user's block chain ID to purchase a sim from Pollen. Solana is a blockchain built for mass adoption. It's a high-performance network that is utilized for a range of use cases, including finance, NFTs, payments, and gaming. Solana operates as a single global state machine, and is open, interoperable and decentralized. Pollen has no awareness of who the user is, Pollen just knows the Solana block chain ID. Thus, Pollen never gets the user's name, social security number, bank accounts, etc. Even further, companies can no longer sell your information to other companies because you the user is unknown. If too many people know the user's identity, the user just changes the identity and sends the new identity out to the user's friend list.

The block chain stores the user identity, Smart Contract, and the public key.

(8) Upon success, the app will store the Smart Contract, Identity, and Public Key into its Wallet 618 (if one exists, otherwise the user can be prompted to create one). The Smart Contract, Identity, and Public key is the only information stored on the user device and all that is necessary for the user device to gain access. All other information that is required is stored in the blockchain.

The wallet stores block chain ID, public key, Smart Contract.

As such, it should be appreciated that a user, configuring a device to operate on the MESH and registering with the block chain results in the user setting up a personal account. The user has the ability to change the user identity associated with that personal account. The end user controls what the user identity is and, the identity controls or defines who can talk to or interact with the user. The block chain owner may control that identity or have authority to control the identity. It should be noted that just because a user belongs to the same block chain as another use, it does not mean that the user can interact with the other user. The users cannot interact unless they provide the other party with the identity. The block chain ID is stored in the user's wallet and links the user to the block chain to which the user belongs. The block chain ID is never published or sent anywhere, it is only used between the software and the backend block chain. Once a user gets in the block chain, the user's identity is the one that the user picks and changes and assigns to him or herself.

The user can change keys and identity. This is accomplished as a function of the app, which gives the user the option to change their public key. To change the keys and identity, the app will generate a new Public Key-Private Key combination. The app then interfaces with the blockchain to request the blockchain to update the new Public Key. Only after the blockchain returns an acknowledgement will the app remove the old key and add the new key to the wallet.

The app gives the user the option to change their identity. This is accomplished by the user entering a new identity into the app. The app will issue a change identity request to the blockchain and present the user's public key old identity and new identity. Only after the blockchain returns and acknowledgement will the app update the wallet.

The user is given the option to connect. Once the app is configured, the user or the client app has the option to connect to the mesh for making or receiving calls. Further, the user or the client app also has the option to disconnect from the mesh. When the client connects to the hub in the mesh, the user's private address and the hubs public address are stored in the users blockchain. After the client app is connected to a hub, the client app is able to receive calls. However, in a private network where addresses are known, a hub is not required and as such, the client app as a member of a private network can already receive calls.

The user can place a call to another user or IOT device. When a user initiates a call to a peer using the peer's identity, the user selects the identity from either their contact list (from the Mesh), recent call list (from the Mesh), or simply by manually entering the user's identity into the device-such as dialing a number on a mobile device. Once the identity is selected, the user actuates a connect button. In response, a request will be sent to the mesh to obtain the peer's Public Key and verify authorization. A tunnel is then set up and once the tunnel is established the call will be made.

The DBC network allows for a wide range of functionality, including M2M and P2M. It should be appreciated that the DBC network can be utilized for more than just making calls and sending messages. For instance, M2M use cases can take advantage of secure communications for a wide range of events, including but not limited to:

Emergency calling

Crowd alerts

Location sensors

In addition, P2M use cases could allow access to mission critical sensors, such as in an automobile.

As previously mentioned, the DBC network utilizes a mesh. The mesh network sits on top of existing data networks. The mesh does not provide data connections but allows for peer-to-peer connections to other clients that are also on the mesh. Further, the mesh allows for full encryption peer-to-peer.

The client devices with the client app are initially connected to the mesh. Clients automatically connect to the mesh once provisioned or configured. Advantageously, this enables other client devices to establish an encrypted connection. All of the network elements in the mesh are nodes. A hub is a special node in that it is a node to which calls and data can be routed.

The network layout of the mesh includes a series of nodes and a location service. The location service is independent of the network nodes. When a node connects to the network it updates the location service. When a client wishes to connect to another node it sends a connect request. The connect request includes address keys and the address keys can be special keys or any root of trust.

In some embodiments, the feature of a Dynamic Client Connection to the mesh is included. In such embodiments, when a client device comes on-line, the client device will ask the location service for the address of the peer to which it wishes to connect. If the peer is routable, then the location service returns the address of the peer. If the peer is not routable, the location service returns the address of the hub to which the peer is connected and the hub's Public Key. The client device then makes a connection either through the hub or direct to the peer. An encrypted tunnel is established peer-to-peer.

The DBC network also provides anonymity and trust. Security, anonymity, and trust are essential for any open solution. The mesh is designed for decentralized identity. Users own their identity and can tie their identity to a blockchain, or any open specification, and can change identity on demand. A client must know the peer identity of a peer to connect to that peer. Connection credentials can also be required.

Figure 7:
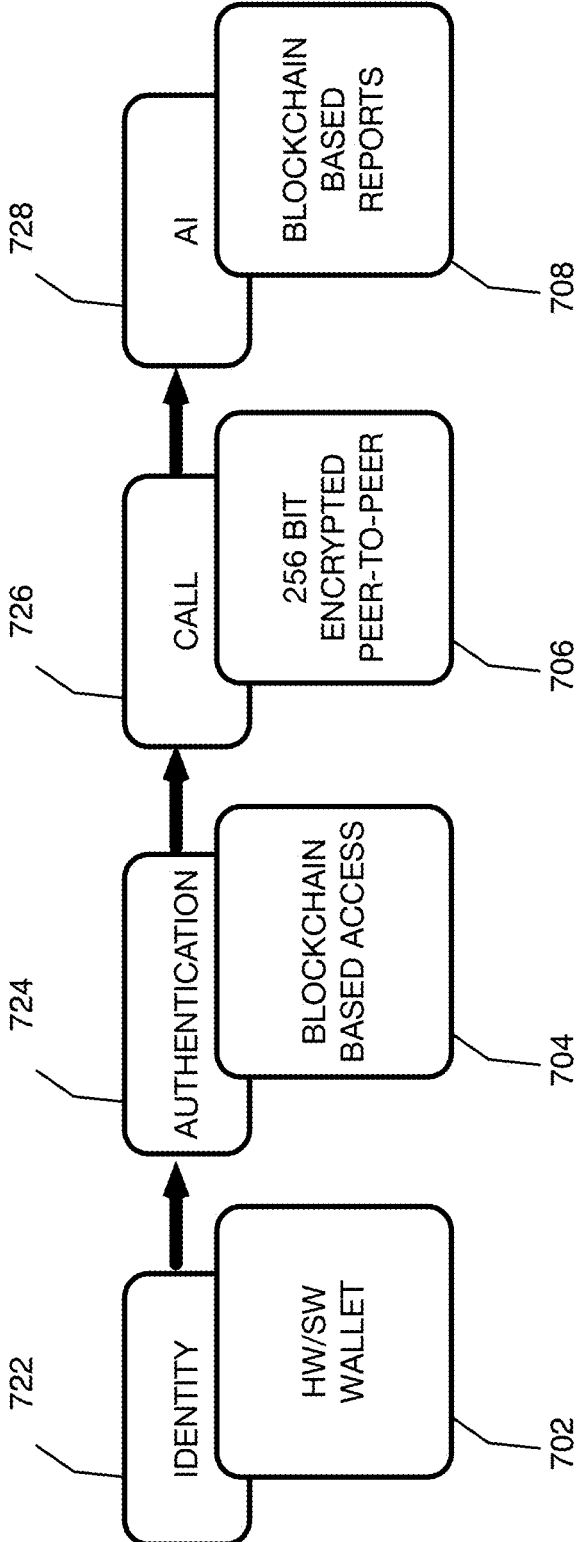
FIG. 7 is a flow diagram illustrating an exemplary flow chart for the DBC network blockchain.

FIG. 7 is a flow diagram illustrating an exemplary flow chart for the DBC network blockchain. Initially, a hardware, software or a combined hardware/software wallet 702 allows users to manage their identity 722. A blockchain based access 704 provides security and hides the identity 722 and requires authentication 724. Encryption peer-to-peer 706 (such as at least 256 bit encryption) provides trust in the network and enables a call or other messages or date to be delivered or received 726. Blockchain based AI reporting 708 allows users to control access to reports and provides the service using AI 728.

Returning to FIG. 4 aspects of the DBC network 400 are described in operation. As a non-limiting illustration of the operation of various embodiments of the DBC network 400, an android 402 and IOT devices 404 are connected to the mesh 400 via Wi-Fi. In the illustrated example, neither device has cellular connectivity and both devices are behind firewalls 406 and 408 respectively, protecting from any incoming requests. Calls can be initiated in either direction through the mesh 400. A hub and location service exist inside the mesh (i.e., elements 110 and 112 in FIG. 1) and both devices are equipped with mesh software, hardware or a combination of both software and hardware.

Android devices are connected to the hub via Wi-Fi and can do so without having a cellular SIM card installed therein. A destination, such as PHIL 410 is selected from the contact. Once selected, the user actuates the green call button 412. This results in a call being placed to the IOT device 404. To disconnect the call, the user actuates the hang-up key (not illustrated).

Now looking at the situation in which a call initiated from the IOT device 404, the client device 402 transitions to an incoming call menu. A ring tone can be sounded and the incoming name may be displayed on the display of the client device 402. A user can then elect to actuate the green answer button, which will result in the client device 402 transitioning to the call menu. At this point, an audio path can be established. When the user desires, the user can actuate the disconnect button to end the call.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method to enable mobile voice communications through a decentralized block chain ("DBC") network, the method comprising:

configuring a mobile telephone to interface with a mesh network (MESH);

the user joining a default smart contract defining the network functionality for the mobile telephone;

the mobile telephone registering with a block chain, wherein the mobile telephone generates a key pair, including a public and private key used to encode communications in the block chain;

the mobile telephone autonomously creating a user identity;

the mobile telephone connecting to the mesh network and providing the smart contract, key pair and user identity;

the mobile telephone receiving a block chain ID from the block chain;

the mobile telephone sharing its user identity with one or more additional devices including at least one Internet of Things (IOT) device to enable voice communications between the mobile telephone and the one or more additional devices, and wherein the mobile telephone and the at least one IOT device are connected to a hub via WiFi and do not have cellular service;

a mobile telephone initiating a voice call from the mobile telephone to the at least one IOT device by calling a network identity associated with the at least one IOT device; and the mobile telephone revising the user identity to maintain privacy.

2. The method of claim 1, further comprising:

the mobile telephone being communicatively connected to the at least one IOT device through the MESH; and voice communications propagating from the mobile telephone to the at least one IOT device being encrypted with a secret key between the mobile telephone and the at least one IOT device and decrypted by the at least one IOT device using its private key.

3. The method of claim 1, wherein the mobile telephone includes an app that is configured to store the smart contract, identity and public key into a wallet on the mobile telephone.

4. The method of claim 3, wherein the app can be invoked by the user to change the user's identity.

5. The method of claim 4, wherein the new identity of the user is shared only with other nodes that are members of the same blockchain with the user.

6. The method of claim 5, wherein the user can maintain anonymity.

7. The method of claim 2, wherein any node in the network can communication with the user as long as that node is registered with the blockchain.

8. The method of claim 2, wherein the mesh network comprises a plurality of nodes and communications propagating between the mobile telephone to the IOT device can travel in a plurality of paths between the various nodes, such that if one of the nodes fails, the communications have other paths through other nodes.

9. The method of claim 1, further comprising:

the mobile telephone being communicatively connected to the at least one IOT device through the mesh network; and voice communications propagating from the mobile telephone to the at least one IOT device being encrypted with a secret key between the mobile telephone and the particular device and decrypted by the IOT device using its private key.

10. The method of claim 9, wherein voice communications propagating from the at least one IOT device to the mobile telephone being encrypted with a secret key between the mobile telephone and the at least one IOT device and decrypted by the mobile telephone using its private key.

11. A method to enable mobile voice communications through a decentralized block chain ("DBC") network for a mobile telephone and between a plurality of devices, wherein at least one of the plurality of devices is an Internet of Things (IOT) device, and wherein a particular mobile telephone and the at least one IOT device are connected to a hub via WiFi and do not have cellular service, the method comprising:

configuring each of a plurality of devices to interface with a mesh network;

the each user associated with the at least one IOT device of the plurality of devices joining a default smart contract defining the network functionality for the at least one IOT device of the plurality of devices;

the at least one IOT device of the plurality of devices registering with a block chain, wherein the at least one IOT device generates a key pair, including a public and private key used to encode communications in the block chain;

the each user creating a user identity;

the at least one IOT device of the plurality of devices connecting to the mesh network and providing the smart contract, key pair and user identity;

the at least one IOT device of the plurality of devices receiving a block chain ID from the block chain;

the at least one IOT device of the plurality of devices sharing its user identity with one or more additional devices of the plurality of devices to enable communications between the devices;

a user initiating a voice call from the mobile telephone to the at least one IOT device by calling a network identity associated with the IOT device; and the user revising the user identity to maintain privacy.

12. The method of claim 11, further comprising:

the mobile telephone being communicatively connected to the at least one IOT device through the mesh; and communications propagating from the mobile telephone to the at least one IOT device being encrypted with a secret key between the mobile telephone and the at least one IOT device and decrypted by the at least one IOT device using its private key.

13. The method of claim 11, wherein each of the plurality of devices includes an app that is configured to store the smart contract, identity and public key into a wallet on the mobile telephone.

14. The method of claim 13, wherein the app can be invoked by the user to change the user's identity.

15. The method of claim 14, wherein the new identity of the user is shared only with other nodes that are members of the same blockchain with the user.

16. The method of claim 15, wherein the user can maintain anonymity.

17. The method of claim 12, wherein any node in the network can communicate with any device of the plurality of devices as long as that node is registered with the blockchain.

18. The method of claim 12, wherein the mesh network comprises a plurality of nodes and voice communications propagating between each of the devices of the plurality of devices can travel in a plurality of paths between the various nodes, such that if one of the nodes fails, the voice communications have other paths through other nodes.

19. The method of claim 11, wherein further comprising a second mobile telephone that is connected to a hub via WiFi and does not have cellular service, further comprising:

a user initiating a voice call from the mobile telephone by calling a network identity associated with the second mobile telephone;

the mobile telephone being communicatively connected to the second mobile telephone through the mesh network; and voice communications propagating from the mobile telephone to the second mobile telephone being encrypted with a secret key between the first mobile telephone and the second mobile telephone and decrypted by the second mobile telephone using its private key.

20. The method of claim 19, wherein voice communications propagating from the second mobile telephone to the mobile telephone being encrypted with a secret key between the first mobile telephone and the second mobile telephone and decrypted by the first mobile telephone using its private key.

* * * * *